United States Patent
Kostyk et al.

(10) Patent No.: US 7,305,325 B2
(45) Date of Patent: Dec. 4, 2007

(54) METHOD TO IMPROVE REQUIREMENTS, DESIGN MANUFACTURING, AND TRANSPORTATION IN MASS MANUFACTURING INDUSTRIES THROUGH ANALYSIS OF DEFECT DATA

(75) Inventors: Tim J. Kostyk, Louisville, KY (US); Theresa C. Kratschmer, Yorktown Heights, NY (US); Jeff R. Layton, New York, NY (US); Peter K. Malkin, Ardsley, NY (US); Stephen G. Perun, Evans, GA (US); Kenneth L. Pyra, Cave Creek, AZ (US); Padmanabhan Santhanam, Yorktown Heights, NY (US); John C. Thomas, Yorktown Heights, NY (US); Scott W. Weller, Penfield, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/330,823

(22) Filed: Jan. 12, 2006

(65) Prior Publication Data

US 2007/0162257 A1 Jul. 12, 2007

(51) Int. Cl.
*G06F 19/00* (2006.01)
*G21C 17/00* (2006.01)

(52) U.S. Cl. .................................................... 702/183
(58) Field of Classification Search ................. 702/183
See application file for complete search history.

(56) References Cited

U.S. PATENT DOCUMENTS

2005/0278597 A1 * 12/2005 Miguelanez et al. ........ 714/738

OTHER PUBLICATIONS

Jack Silberman, "Robot Orthogonal Defect Classification Towards an In-Process Measurement System for Mobile Robot Development," Jan. 1998.

* cited by examiner

*Primary Examiner*—John Barlow
*Assistant Examiner*—Cindy D. Khuu
(74) *Attorney, Agent, or Firm*—Michael J. Buchenhorner; Casey P. August

(57) ABSTRACT

A computer-implemented method of optimizing at least one production or testing processes in a mass manufacturing industry, includes steps of: collecting error data relating to a product at a plurality of points along its production and distribution chain; classifying the error data into categories of errors to provide classified error data; analyzing relationships among the classified error data; and suggesting modifications to at least one of the production or testing processes based on the analysis.

17 Claims, 6 Drawing Sheets

METHOD TO IMPROVE REQUIREMENTS, DESIGN MANUFACTURING, AND TRANSPORTATION IN MASS MANUFACTURING INDUSTRIES THROUGH ANALYSIS OF DEFECT DATA

TECHNICAL FIELD

The invention relates generally to the use of information technology in industrial processes and more specifically to mass manufacturing processes.

BACKGROUND OF THE INVENTION

The problem addressed by the present invention is errors in mass manufacturing processes. Minimizing costs and improving product quality is a goal of any company developing products. To the manufacturer one of the most costly aspects in a product's life cycle is servicing product defects after the product has left manufacturing. Present methods use quality control tests on a manufactured item that are done by a single department such as a quality control department. Such tests are expensive to perform and it is also expensive and difficult to use the results. One present technology is Orthogonal Defect Classification (ODC) which addresses software defects found during development and by customers, but only software, not hardware and only defects found during development. Another known method is Orthogonal Problem Classification (OPC), which addresses software problems reported by customers, but does not address mass manufacturing industry, it only addresses software.

Another technology, Warranty Management Solutions (WMS) facilitates handling by management of warranty related data but provides no feedback to modify production. Quality Control testing products before product release provide no feedback mechanism back to production and design facilities.

In their report B. Freimut, C. Denger, and M Ketter, "An Industrial Case Study of Implementing and Validating Defect Classification for Process Improvement and Quality Management," Proceedings of the 11$^{th}$ IEEE Software Metrics Symposium (METRICS 2005), Sep. 19-22, 2005, pages 19-29), provide a general description of a consulting-like engagement where they provide suggestions to a production organization based on an analysis of product defects. They do not provide any specifics of either their defect classifications or their analysis methods.

In his report, Jack Silberman, "Robot Orthogonal Defect Classification Towards an In-Process Measurement System for Mobile Robot Development," doctoral dissertation, *Tech. Report CMU-RI-TR-99-05, Robotics Institute, Carnegie Mellon University*, January, 1998, describes how the ODC methodology can be extended to determine and provide production process modification suggestion to an organization creating mobile robots, these robots including both hardware and software. He does not provide any description of how the ODC methodology can be used to support mass manufacturing of products that include both hardware and software. Therefore, there is a need for a solution that overcomes the deficiencies of the prior art.

SUMMARY OF THE INVENTION

Briefly according to an embodiment of the invention, to solve the above-discussed problems a product service event classification (PSEC) method is used. The computer-implemented PSEC method of optimizing one or more of the production or testing processes in a mass manufacturing industry comprises steps of: collecting error data relating to a product at a plurality of points along its production and distribution chain; classifying the error data into categories of defects to provide classified error data; analyzing relationships among the classified error data; and suggesting modifications to one or more of the production or testing processes based on the analysis. The foregoing and other aspects, features, and advantages of the invention will become more apparent from the following description and from the claims.

BRIEF DESCRIPTION OF FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

An embodiment of the invention is a method of optimizing the production and testing of products produced by a mass manufacturer, i.e. where many (virtually) identical copies of a given product are produced in exactly the same way. This is in contrast to cases where heroic, unique methods are used each time. The preferred embodiment will describe how the current invention is used to optimize the production and testing processes of a mass manufacturing plant 3010, whose products 1000 are sold by a product dealer 3020 and repaired by a product service provider 3030 (as will be described in detail with references to FIGS. 1-5).

Figure 1:
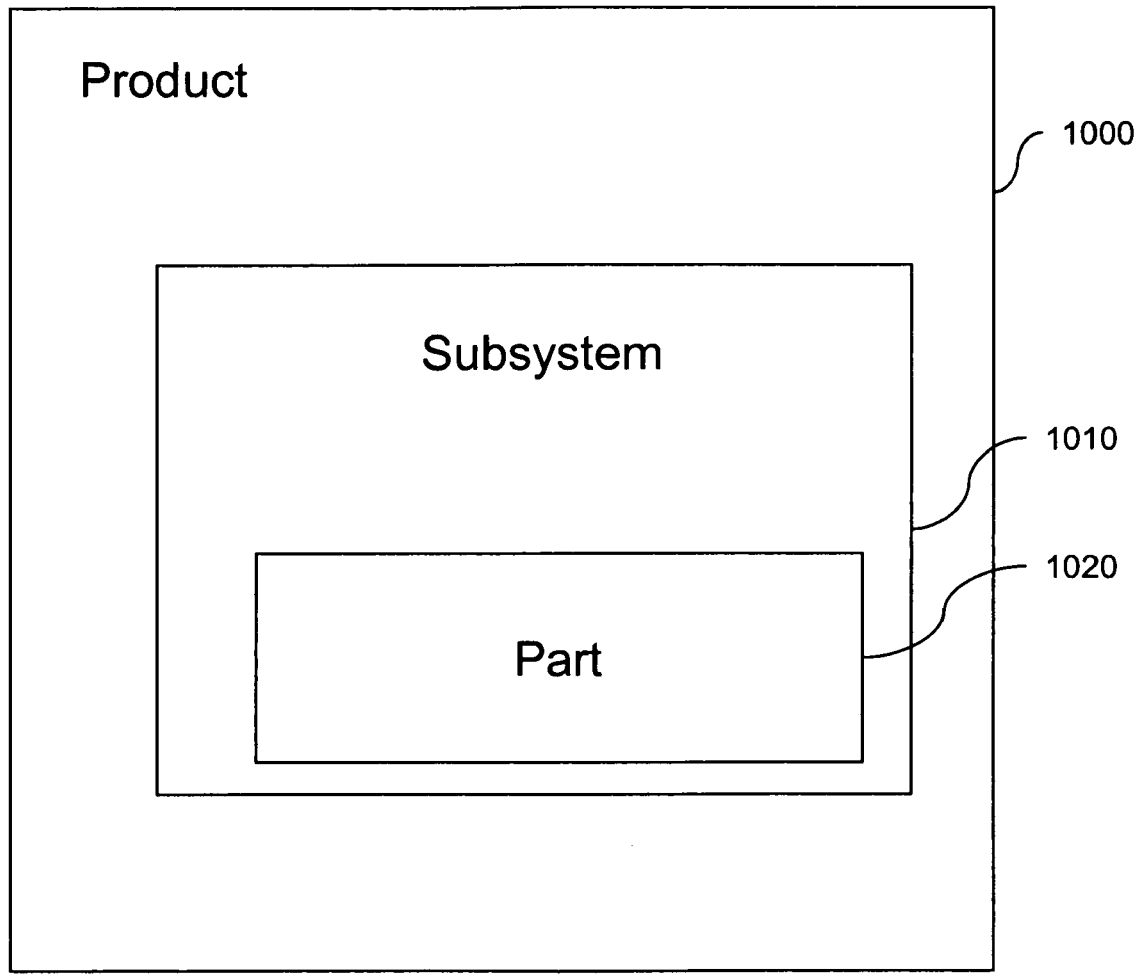
FIG. 1 is a simplified illustrative block diagram of a mass-manufactured product handled by a method according to one embodiment of the invention.

FIG. 1 is a component block diagram of an example of the product 1000 produced, sold and serviced in the preferred embodiment. As shown, the product 1000 includes a subsystem 1010, which includes apart 1020. Although only a single subsystem 1010 and a single part 1020 are shown, the current invention is also applicable to products 1000 that include two or more subsystems 1010 and subsystems 1010 that include two or more parts 1020. An example of such a product is a personal computer (product), a communication subsystem (the subsystem), and a chipset (port) according to a protocol such as the Ethernet.

Figure 2:
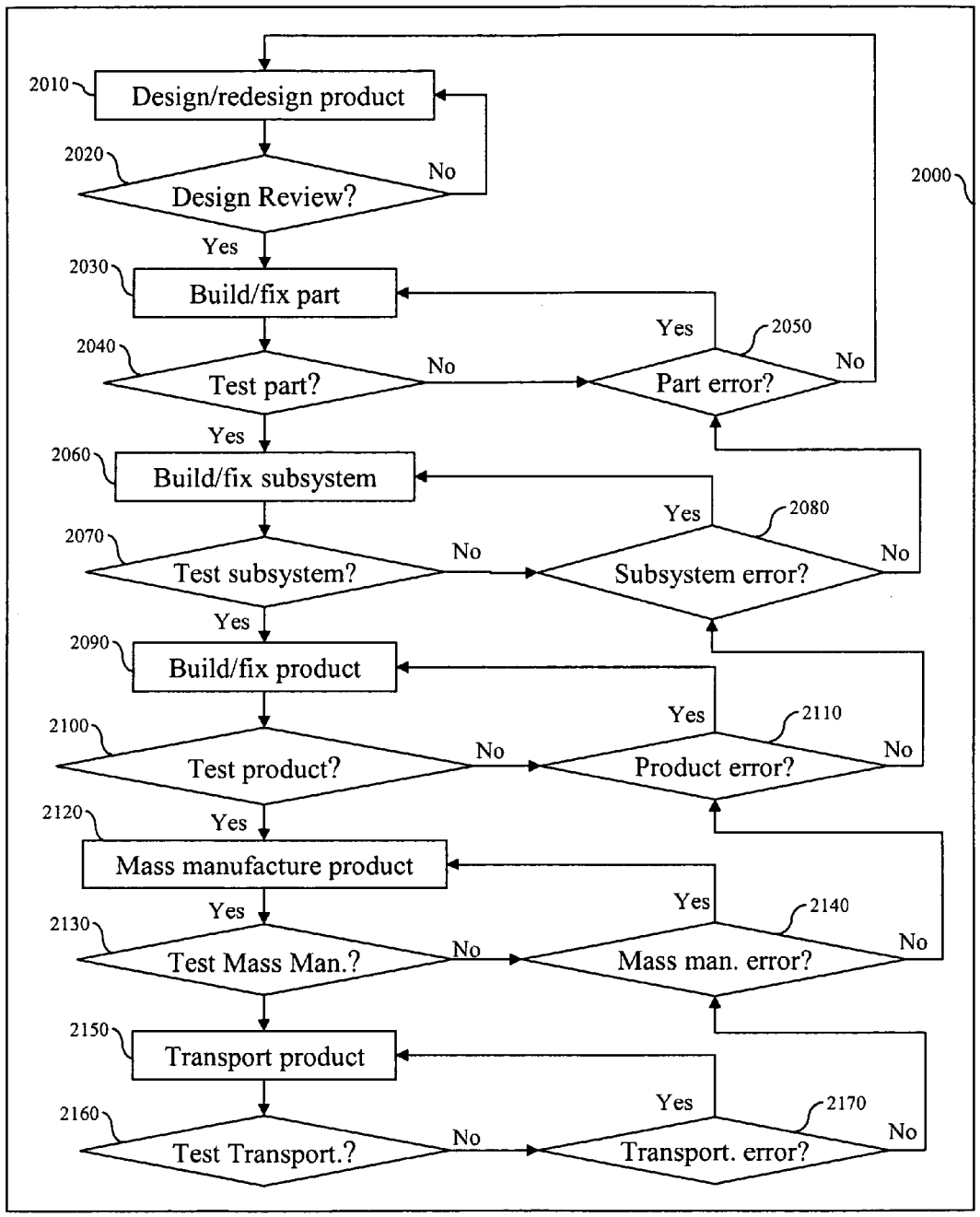
FIG. 2 is an illustrative flow diagram of the mass manufacturing industry's production, testing, and delivery processes according to one embodiment of the invention.

FIG. 2 is an illustrative flow diagram of the mass manufacturing industry's production, testing, and delivery processes 2000 according to an embodiment of the invention. As shown, the overall process 2000 begins at step 2010 where the design of the product 1000 is created. Next, in step 2020, the design is reviewed, and, if any errors (defects) are identified, control continues at step 2010, where the identified design error is corrected. Otherwise, in step 2030, an instance of the part 1020 is built, followed by step 2040 where the instance of the part 1020 is tested. If an error is identified, then step 2050 checks whether it is a part error. If so, control continues at step 2030 where the error is corrected. If the error is not a part error, then it must be design error and so control continues at step 2010 where the design is corrected to overcome the error. If no part error is found in step 2040, then control continues at step 2060 where an instance of the subsystem 1010 is built. Next, the instance of the subsystem 1010 is tested in step 2070. If an error is detected, then in step 2080 the error is checked to determine if it one with the subsystem. If so, control continues at step 2060 where the subsystem error is corrected. If the detected error is not one with the subsystem, then control continues at step 2050, which determines how the detected error, either a part or design error, is handled, as described above.

If step 2070 does not detect any errors, then step 2090 is executed, where an instance of the product 1000 is built, following which the product 1000 instance is tested in step 2100. If an error is detected, then in step 2110 the error is checked to determine if it one with the product. If so, control continues at step 2090 where the product error is corrected. If the detected error is not one with the product, then control continues at step 2080, which determines how the detected error, either a subsystem, part or design error, is handled, as described above.

If step 2100 does not detect any errors, then step 2120 is executed, where an instance of the mass manufactured product 1000 is created using the mass manufacturing process (e.g., including but not limited to an assembly line, and robotics), following which the mass manufactured product 1000 instance is tested in step 2130. If an error is detected, then in step 2140 the error is checked to determine if it one with the mass manufacturing process (e.g., the bolts that hold the wheels on are not being sufficiently tightened). If so, control continues at step 2120 where the mass manufacturing process error is corrected (e.g., wheel bolts are screwed on more tightly). If the detected error is not one with the mass manufacturing process, then control continues at step 2110, which determines how the detected error, either a product, subsystem, part or design error, is handled, as described above.

If step 2130 does not detect any errors, then step 2120 is executed, where the instance of the mass manufactured product 1000 is transported to the Product Dealer 3020 (described in detail with reference to FIG. 3). Once delivered, mass manufactured product 1000 instance is tested in step 2160. If an error is detected, then in step 2170 the error is checked to determine if it one with the transportation process (e.g., the product's paint scratched by the vehicles that carry the product to the Product Dealer 3020). If the error is one with the transportation process, control continues at step 2150 where the transportation process error is corrected (e.g., the products are covered with a protective wrap before being shipped). If the detected error is not one with the transportation process, then control continues at step 2140, which determines how the detected error, either a mass manufacturing process, product, subsystem, part or design error is handled, as described above.

Skilled artisans will appreciate that any of test processes other than Design Review 2020 (i.e., Part Test 2040, Subsystem Test 2070, Product Test 2100, Mass Manufacturing Test 2130 and Transportation Test 2160) could include stress testing (i.e., operating a given component [i.e., part, subsystem or product] up to or beyond one or more of its specified maximum limits) and environmental testing (i.e., testing a given component in one or more of is specified maximally adverse conditions). So, for example, the Part Test 2040 for tires could include running the inflated tires repeatedly of a series of bumps (for stress testing). Similarly for environmental testing, the Manufacturing Test 2130 could include driving each car (cars being the product) through 110 degree (Fahrenheit) heat.

Figure 3:
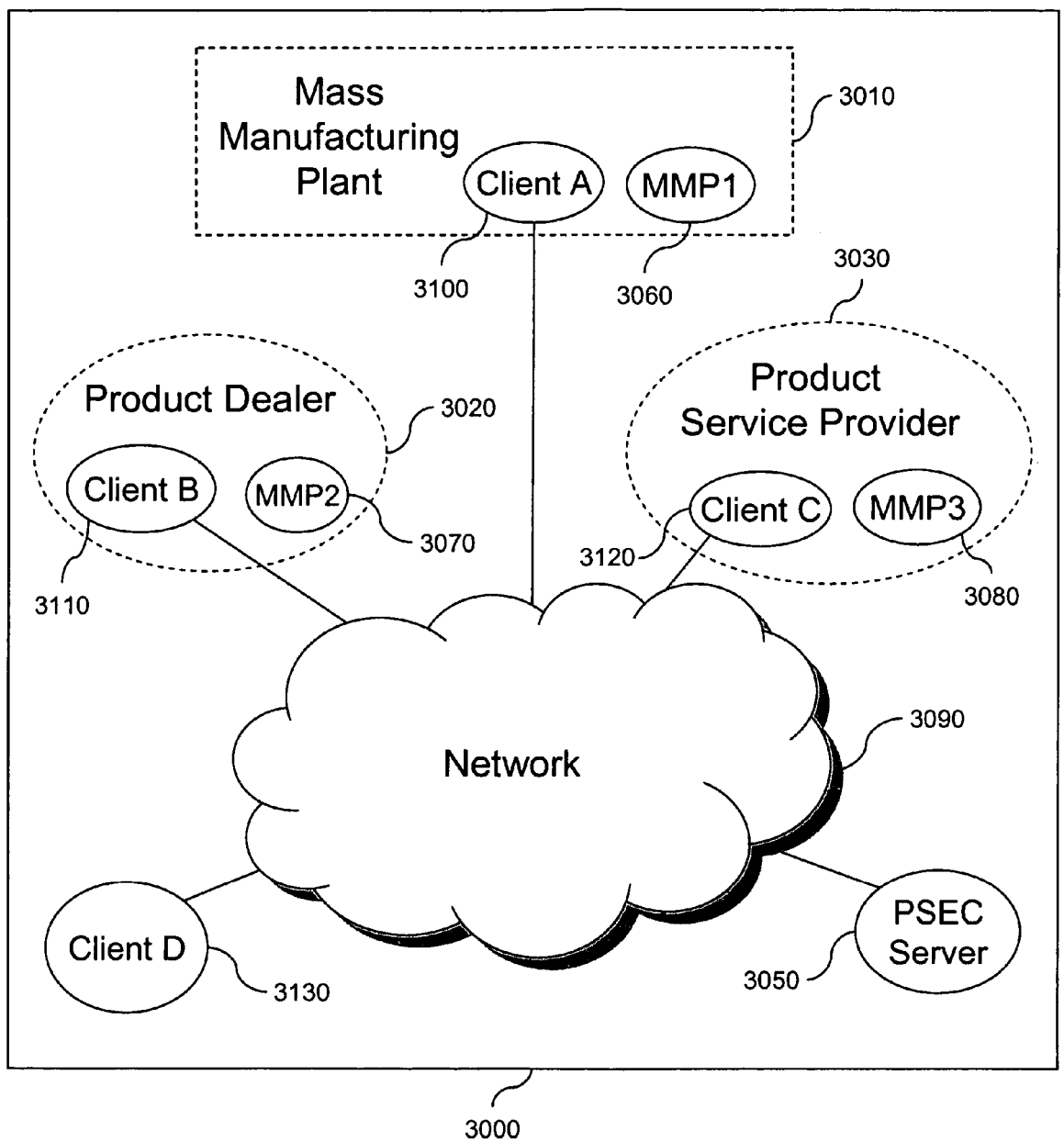
FIG. 3 is an illustrative schematic diagram of a network architecture for one embodiment of the invention.

FIG. 3 depicts a network topology 3000 providing an execution environment implementing the functionality of a system for the current embodiment. The network topology 3000 includes: a Mass Manufacturing Plant 3010; a Product Dealer 3020; a Product Service Provider 3080; a Client D 3130, and a PSEC Server 3050. The Mass Manufacturing Plant 3010 comprises a location, including, but not limited to a building, or set of buildings, co-located or geographically distributed, wherein a Client A 3100 and an instance of mass manufactured product 1000 (MMP1 3060) is located. This location 3010 is where instances of the mass manufactured product 1000 are created.

The Product Dealer 3020 comprises a location, including, but not limited to a building, or set of buildings, co-located or geographically distributed, wherein a Client B 3110 and an instance of mass manufactured product 1000 (MMP2 3070) is located. This location 3020 is where instances of the mass manufactured product 1000 are sold.

The Product Service Provider 3030 depicts a location, including, but not limited to a building, or set of buildings, co-located or geographically distributed, wherein a Client C 3120 and an instance of mass manufactured product 1000, MMP3 3080 are located. This location 3030 is where instances of the mass manufactured product 1000 are repaired or serviced.

Each of Clients A-D 3100-3130 and the PSEC Server 3050 are able to communicate with each other via a network 3090. The network 3090 comprises: the Internet, an internal intranet, or a public or private wireless or wired telecommunication network.

Skilled artisans will appreciate that although only one each of the Mass Manufacturing Plant 3010, the Product Dealer 3020 and the Product Service Provider 3030 are depicted in FIG. 2, other embodiments are also applicable to cases where there are a greater number of one or more of these entities 3010-1030. Skilled artisans will also appreciate that other embodiments are also applicable to cases where the three entities 3010-3030 are co-located.

Each of Clients A-D 3100-3130 enable an authorized user to interact with the PSEC Server 3050 (as will be discussed in further detail below) with reference to FIGS. 3-5. An example of a platform that supports the Clients A-D 3100-3130 includes any computing node that can act as web client (i.e., runs a web browser application and can communicate with the PSEC Server 3050 via the network 3090). Such software comprises Microsoft's Internet Explorer®. Still another example of a platform that supports the Clients A-D 3100-3130 includes, but is not limited to: an IBM ThinkPad running on a Windows based operating system such as Windows XP, or like operating system. Other contemplated operating systems include Linux, UNIX, and the like.

Clients A-D 3100-3130 may also include network-connectable mobile (i.e., portable) devices such as some cellular telephones (i.e., devices which function as a cellular telephone and execute network applications, like web browsers).

Although only four Clients A-D 3100-3130 are shown in FIG. 1, the current invention is also applicable to any number of client nodes greater than or equal to 1.

Further, while the preferred embodiment includes a Web-based (i.e., HTTP) client 3100-3130, other forms of network communication are also applicable, such as a sockets-based client/server architecture, e.g., implementing secure sockets layer (SSL) or like network communications protocols.

Skilled artisans will appreciate that the current invention is also applicable to cases where there is only a single client node, which resides on the same machine as the PSEC Server 3050, thereby eliminating the need for any network communication at all.

Figure 4:
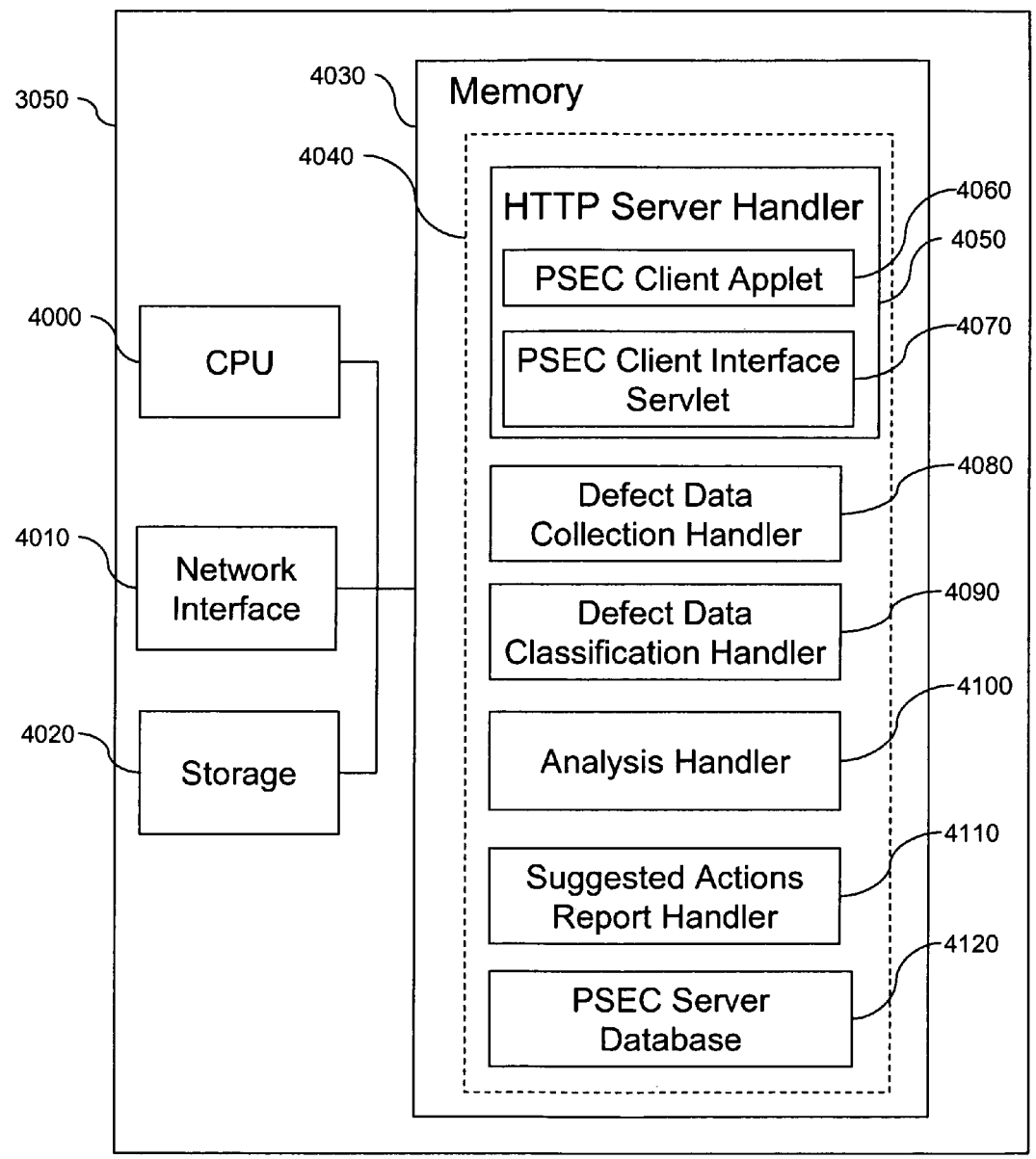
FIG. 4 is an illustrative block diagram of a PSEC Server according to one embodiment of the invention.

FIG. 4 is a block diagram of the PSEC Server 3050. The PSEC Server 3050 is a computing node that acts as an HTTP server. The PSEC Server 3050 includes a CPU 4000, a network interface 4010, and a storage device 4020 such as a disk or data access storage device (DASD), and memory 4030, such as RAM. The network interface 4010 allows the PSEC Server 3050 to communicate with other network connected nodes via the network 3090. Such interfaces include, but are limited to: Ethernet, and wireless IP (Internet Protocol, e.g., LEAP, CDMA or WAP). In the present embodiment, the PSEC Server 3050 also includes PSEC Server logic 4040, which is embodied as computer executable code that is loaded into memory 4030 (for execution by CPU 4000) from a remote source (e.g., over the network 3090 via the network interface 4010), local permanent optic (CD-ROM), or from the storage device 4020 (e.g. disk or DASD).

The PSEC Server logic 4040 stored in the memory 4030 includes an HTTP Server Handler 4050, which includes a PSEC Client Applet 4060 and a PSEC Client Interface Servlet 4070. The PSEC Server logic 4040 further includes a Defect Data Collection Handler 4080, a Defect Data Classification Handler 4090, an Analysis Handler 4100, a Suggested Actions Report Handler 4110, and a PSEC Server Database 4120.

The HTTP Server Handler 4050 is an application that can respond to HTTP communications, comprising: the WebSphere™ product sold by IBM.

The PSEC Client Applet 4060 and PSEC Client Interface Servlet 4070 together enable an authorized end-user to communicate with the Defect Data Collection Handler 4080, Defect Data Classification Handler 4090, Analysis Handler 4100, and Suggested Actions Report Handler 4110. When the end-user wants to interact with the PSEC Server 3050, the end-user first downloads the PSEC Client Applet 4060 to a web browser running on their client, Clients A-D 3100-3130. To download the PSEC Client Applet 4060, the end-user must provide sufficient credentials (e.g., user ID and password).

After the PSEC Client Applet 4060 has been downloaded and enabled, the PSEC Client Applet 4060 communicates directly with the PSEC Client Interface Servlet 4070, which is executing in the HTTP Server Handler 4050. The HTTP Server Handler 4050, in turn, communicates locally with the other handlers 4090-4110 executing on the server 4050. Skilled artisans will recognize that this applet/servlet paring is well known in the art (e.g., see Jason Hunter with William Crawford, Java Servlet Programming (Sebastopol, Calif.: O'Reilly & Associates, Inc., 1988), pp. 277-337). Skilled artisans will also appreciate that the communication between the Clients A-D 3100-3130 and the handlers 4090-4110, in other embodiments can be implemented using other socket-based applications.

The PSEC Server Database 4120 allows the PSEC Server 3050 to store, modify, and delete data related to misinformation, usage patterns, users, and online community servers. A detailed description of the information maintained by the PSEC Server Database 4120 is given below. The PSEC Server Database 4120 can be implemented using database tools such as the DB/2 product sold by IBM, and like database platforms. One with skill in the art will appreciate that in other embodiments, the PSEC Server Database 4120 can be a service that runs on another server and is accessed by the PSEC Server 3050 via the network 3090.

The Defect Data Collection Handler 4080 enables the current invention to gather a set of defect data regarding the mass manufactured product 1000 and the processes of its production, testing and delivery 2000. This data includes but is not limited to:

Defects founds during product 1000 development, such as design defects discovered during the design review 2020, Defects found in instances of the product 1000 after manufacturing 2110, but before delivery, such as cases where the mass manufacturing process 2120 has failed to tighten the bolts that hold the wheels on.

Defects that occur as a result of the transportation process 2150, such as paint being chipped during shipping due insufficient secure restraints in the delivery vehicle, and Defects found at the Product Service Provider 3030, such as a case where an unreliable tire is identified by the fact that many instances of the product 1000 are brought in where one or more of the tires has burst during operation.

Note that this data comes from in-process and post delivery. All such data is stored in the PSEC Server Database 4120.

The Defect Data Classification Handler 4090 takes all of the stored defects and either types or adds types to each defect, storing results in the PSEC Server Database 4120. This set of attributes categories and associated values is called the PSEC scheme. It is it uses some of the categories and values of the ODC scheme, as well as adding new categories and new values.

In the current invention there are two types of defect attributes: opener data, that which is known when the defect is first discovered, and closer data, which is only available after a given defect has been resolved. In the current invention, the opener data associated with each that is stored in the PSEC Server Database 4120 comprises:

Unique ID, which can be used to distinguish one defect from all others.

VIN (Vehicle Identification Number), which, in the preferred embodiment is the unique encoded alphanumeric string that every automobile has assigned to, this string not only including a unique ID (serial number) for the car, but also indication the car's make, model, and manufacturing plant (for details, see http://en.wikipedia.org/wiki/VIN).

Ownership Duration indicates long the product was owned before the defect occurred. In one embodiment of the current invention these revealing conditions include, but are not limited to (note that they are listed in order of shortest to longest):

Short—Year or less,

Medium—1 to 5 years,

Long—5 years to disposal.

One skilled in the art will appreciate that the current invention also includes embodiments in which the Ownership Duration attribute has more or less than 3 values, and in which the values differ from those above (values applicable for the automotive industry). Such alternatives are needed for other mass manufacturing industries, such as the aeronautics industry, whose product: planes are owned and used for well over 5 years, on average. Thus the Long value would have to be greater than 5. Such values are also necessary because different industries have warranty periods of different length.

Conditions Revealing Defect, indicates must be done to product for the defect to occur. In one embodiment of the current invention these revealing conditions include (but are not limited to):

Single Function: execution of single feature, e.g., windshield wipers don't work correctly at any speed.

Single Function with Option: execution of a single with some option, e.g. windshield wipers don't work at "slow."

Interaction, execution of multiple functions exposes the defect

Sequencing: execution of multiple functions in a specific order.

Workload/Stress: operating the entire product 1000 at extreme conditions.

Recovery/Exception: testing product's reaction to crashes, e.g., airbags didn't deploy.

Startup/Restart: e.g., restarting product 1000.

Environmental: executing product in specific environmental condition.

Stress: testing extremes at a part 1020 level

Open Date indicates when the defect was reported.

In-Process indicates whether or not the given defect occurred while the product was being developed.

Product Impact indicates the most pronounced impact the defect had on the products. One embodiment of the current invention includes the following (note that they are listed in order or greatest to least importance):

Fire

Theft

Product Inoperable/Damaged

Safety Impairment

Function Inoperable/Damaged

Diminished Aesthetics (looks)

Diminished Performance

Non Product Impact indicates the most pronounced impact the given defect had on non-product entities. One embodiment of the current invention includes the following Note that values are listed from most to least important):

Death—Death occurred due to defect

Personal Injury—Personal Injury occurred due to defect

Safety Impairment—Product Unsafe to operate

Property Damage—Property Damaged occurred due to defect

None

In the current embodiment, the closer data associated with each that is stored in the PSEC Server Database 4120 comprises:

Phase Found indicates where the defect should have been caught. One embodiment of the current invention includes the following. (Note that the values are listed from earlier to later in the overall mass manufacturing process 2000):

Design Review 2020,

Part test 2040,

Subsystem test 2070,

Product test 2100,

Mass Manufacturing test 2130, and

Transportation test 2160.

Close Date indicates when the defect was finally corrected

Repair Cost indicates how much it cost to fix the given defect. An example of values used by the preferred embodiment includes:

Low—Less than $100, e.g., for simple part 1020 replacements and repairs,

Medium—$100-$1,000, e.g., for subsystem 1010 replacements and repairs,

High—$1,000-$100,000, e.g. for product 1000 replacement, repair and redesign, and Extreme—Greater than $100,000, e.g. for retooling and redesign of mass manufacturing or transportation processes.

Part Hierarchy indicates an identification hierarchy for the defective element. One embodiment of the current invention uses the automobile part hierarchy from NHSTA TREAD:

Body
body:exterior
body:exterior:decals
body:exterior:exterior trim/moldings
body:exterior:paint
body:exterior:paint:paint-bumper
body:exterior:paint:paint-door
body:exterior:paint:paint-fender
body:exterior:paint:paint-hood
body:exterior:paint:paint-moldings/trim
body:exterior:paint:paint-quarterpanel
body:exterior:paint:paint-roof
body:exterior:paint:paint-tailgate
body:exterior:paint:paint-truck bed/box
body:exterior:paint:paint-trunk/hatch
body:glass
body:glass:backglass
body:glass:backglass:fixed backglass sealing
body:glass:backglass:heated backglass elements
body:glass:backglass:liftgate hinges and sealing
body:glass:mirrors
body:glass:mirrors:exterior mirrors
body:glass:mirrors:interior mirrors
body:glass:side glass
body:glass:windshield
body:glass:windshield:windshield sealing
body:interior
body:interior:carpet/floor mats
body:interior:headlining
body:interior:instrument panel/console/glove box
body:interior:interior trim/panels
body:locks/latches
body:locks/latches:door
body:locks/latches:door:door-front
body:locks/latches:door:door-rear
body:locks/latches:fuel door
body:locks/latches:fuel door:remote release
body:locks/latches:glove box/console/storage compartment
body:locks/latches:hood
body:locks/latches:hood:remote release
body:locks/latches:ignition lock and cylinder
body:locks/latches:power locks/rke
body:locks/latches:tailgate
body:locks/latches:tailgate:remote release
body:locks/latches:trunk/hatch
body:locks/latches:trunk/hatch:remote release
body:restraints
body:restraints:airbags
body:restraints:airbags:airbag module/sensors body:restraints:airbags:clock spring
body:restraints:airbags:driver airbag
body:restraints:airbags:horn switch and assy
body:restraints:airbags:passenger airbag
body:restraints:airbags:side airbag/curtain
body:restraints:seat belts
body:restraints:seat belts:buckles
body:restraints:seat belts:child seats
body:restraints:seat belts:front belts
body:restraints:seat belts:pretensioners
body:restraints:seat belts:rear belts
body:restraints:seat belts:retractors
body:seating
body:seating:covers/pads
body:seating:headrests
body:seating:seat frame
body:seating:track/tilt
body:seating:track/tilt:manual seat
body:seating:track/tilt:power seat
body:structure/sheetmetal
body:structure/sheetmetal:bumpers
body:structure/sheetmetal:cowl
body:structure/sheetmetal:door
body:structure/sheetmetal:door: door and sideglass sealing
body:structure/sheetmetal:door:door-front
body:structure/sheetmetal:door:door-rear
body:structure/sheetmetal:fenders
body:structure/sheetmetal:floorpan
body:structure/sheetmetal:hood
body:structure/sheetmetal:hood:liftcylinders
body:structure/sheetmetal:quarterpanels
body:structure/sheetmetal:roof
body:structure/sheetmetal:roof:convertible
body:structure/sheetmetal:roof:removable/hardtop
body:structure/sheetmetal:roof:roof rack/bed accessories
body:structure/sheetmetal:roof:sun/moonroof
body:structure/sheetmetal:roof:t-top
body:structure/sheetmetal:tailgate
body:structure/sheetmetal:tailgate:tailgate sealing
body:structure/sheetmetal:truck bed/box
body:structure/sheetmetal:trunk/hatch
body:structure/sheetmetal:trunk/hatch:liftcylinders
body:structure/sheetmetal:trunk/hatch:trunk/hatch sealing
body:structure/sheetmetal:unibody
body:structure/sheetmetal:unibody:static metal sealing
body:window mechanisms
body:window mechanisms:manual mechanisms
body:window mechanisms:power mechanisms
chassis
chassis:axle (solid)
chassis:axle (solid):front axle
chassis:axle (solid):rear axle
chassis:differential
chassis:driveshaft/halfshaft
chassis:driveshaft/halfshaft:driveshaft (in-line)
chassis:driveshaft/halfshaft:driveshaft (in-line):front driveshaft
chassis:driveshaft/halfshaft:driveshaft (in-line):rear driveshaft
chassis:driveshaft/halfshaft:halfshaft
chassis:driveshaft/halfshaft:halfshaft:front halfshaft
chassis:driveshaft/halfshaft:halfshaft:rear halfshaft
chassis:frame
chassis:parking brakes
chassis:service brakes
chassis:service brakes:abs/traction control
chassis:service brakes:abs/traction control:abs module
chassis:service brakes:abs/traction control:hydraulic control unit
chassis:service brakes:abs/traction control:sensors/tone rings
chassis:service brakes:air brake system
chassis:service brakes:brake lines/hoses
chassis:service brakes:brake pedal
chassis:service brakes:caliper/wheel cylinder
chassis:service brakes:hub/wheel bearings
chassis:service brakes:master cylinder/booster/hydro-boost
chassis:service brakes:pads/shoes/linings
chassis:service brakes:rotor/drum
chassis:steering
chassis:steering:steering column
chassis:steering:steering gear/rack
chassis:steering:steering lines/hoses
chassis:steering:steering linkage
chassis:steering:steering pump/reservoir
chassis:steering:steering wheel
chassis:suspension
chassis:suspension:active suspension
chassis:suspension:air suspension
chassis:suspension:alignment
chassis:suspension:alignment:front suspension
chassis:suspension:alignment:rear suspension
chassis:suspension:shock absorbers/struts
chassis:suspension:shock absorbers/struts:front suspension
chassis:suspension:shock absorbers/struts:rear suspension
chassis:suspension:spindles/supports
chassis:suspension:spindles/supports:front suspension
chassis:suspension:spindles/supports:rear suspension
chassis:suspension:springs
chassis:suspension:springs:front suspension
chassis:suspension:springs:rear suspension
chassis:suspension:stabilizers
chassis:suspension:stabilizers:front suspension
chassis:suspension:stabilizers:rear suspension
chassis:transfer case
chassis:transfer case:bearings
chassis:transfer case:case and housing
chassis:transfer case:controls
chassis:transfer case:gears
chassis:transfer case:seals and gaskets
chassis:transfer case:shafts
chassis:wheel assy
chassis:wheel assy:lugs and studs
chassis:wheel assy:spare tire and stowage
chassis:wheel assy:tire change/repair
chassis:wheel assy:tire change/repair:jack
chassis:wheel assy:tire change/repair:lug wrench
chassis:wheel assy:tire change/repair:tire repair kit
chassis:wheel assy:tire pressure monitoring system
chassis:wheel assy:tires
chassis:wheel assy:tires:tire bead
chassis:wheel assy:tires:tire belts
chassis:wheel assy:tires:tire sidewall
chassis:wheel assy:tires:tire tread
chassis:wheel assy:wheels/rims
chassis:wheel assy:wheels/rims:tire valve stem and core
chassis:wheel assy:wheels/rims:wheel balance weights chassis:wheel assy:wheels/rims:wheel covers/ornaments
electrical
electrical:accessories/entertainment
electrical:accessories/entertainment:anti-theft
electrical:accessories/entertainment:clock
electrical:accessories/entertainment:compass/thermometer
electrical:accessories/entertainment:mobile communication
electrical:accessories/entertainment:navigation system
electrical:accessories/entertainment:powerpoint/lighter
electrical:accessories/entertainment:reverse sensing
electrical:accessories/entertainment:sound system
electrical:accessories/entertainment:sound system:antenna
electrical:accessories/entertainment:sound system:cd player/changer
electrical:accessories/entertainment:sound system:equalizer/amplifier
electrical:accessories/entertainment:sound system:radio
electrical:accessories/entertainment:sound system:sound system remote control
electrical:accessories/entertainment:sound system:speakers
electrical:accessories/entertainment:sound system:subwoofer
electrical:accessories/entertainment:sound system:tape player
electrical:accessories/entertainment:video system
electrical:accessories/entertainment:voice control
electrical:climate control
electrical:climate control:a/c clutch
electrical:climate control:a/c compressor
electrical:climate control:blower motor
electrical:climate control:cables/linkage/ducts
electrical:climate control:controls/relays/switches
electrical:climate control:heater core/cond/evap
electrical:climate control:hoses
electrical:climate control:refrigerant
electrical:driving controls/multifunction switches
electrical:driving controls/multifunction switches:electric tilt steering controls
electrical:driving controls/multifunction switches:hazard light switch
electrical:driving controls/multifunction switches:headlight dimmer switch/auto-lamp
electrical:driving controls/multifunction switches:speed control switches
electrical:driving controls/multifunction switches:turn signal switch
electrical:driving controls/multifunction switches:wiper/washer controls
electrical:instrument/display
electrical:instrument/display:amp/voltage gauge
electrical:instrument/display:boost gauge
electrical:instrument/display:coolant temperature gauge
electrical:instrument/display:coolant temperature gauge:coolant temperature sender/receiver
electrical:instrument/display:fuel gauge
electrical:instrument/display:fuel gauge:fuel gauge sender/receiver
electrical:instrument/display:message center
electrical:instrument/display:message center:fuel computer
electrical:instrument/display:odometer/hour meter
electrical:instrument/display:odometer/hour meter:tripminder
electrical:instrument/display:oil pressure gauge
electrical:instrument/display:oil pressure gauge:oil pressure sender/receiver
electrical:instrument/display:oil temperature gauge
electrical:instrument/display:oil temperature gauge:oil temperature sender/receiver
electrical:instrument/display:speedometer
electrical:instrument/display:speedometer:speedometer sender/receiver
electrical:instrument/display:tachometer
electrical:instrument/display:tachometer:engine speed sensor
electrical:instrument/display:warning chimes/lights
electrical:instrument/display:warning chimes/lights: 4wd/range indicator/warning
electrical:instrument/display:warning chimes/lights: abs/traction control warning
electrical:instrument/display:warning chimes/lights: airbag warning
electrical:instrument/display:warning chimes/lights: brake system warning
electrical:instrument/display:warning chimes/lights: charge warning
electrical:instrument/display:warning chimes/lights: check engine light/mil
electrical:instrument/display:warning chimes/lights: coolant temperature warning
electrical:instrument/display:warning chimes/lights: door ajar warning
electrical:instrument/display:warning chimes/lights: lamp out indicator
electrical:instrument/display:warning chimes/lights: low fuel warning
electrical:instrument/display:warning chimes/lights: o/d indicator
electrical:instrument/display:warning chimes/lights:oil pressure/level low warning
electrical:instrument/display:warning chimes/lights: seat belt warning
electrical:lamps/bulbs
electrical:lamps/bulbs:back-up lamps
electrical:lamps/bulbs:brakelamps/himount brakelamp
electrical:lamps/bulbs:cargo/engine compartment lamps
electrical:lamps/bulbs:cornering lamps
electrical:lamps/bulbs:fog lamps
electrical:lamps/bulbs:headlamps/daytime running lights
electrical:lamps/bulbs:instrument illumination
electrical:lamps/bulbs:interior lighting
electrical:lamps/bulbs:license plate lamps
electrical:lamps/bulbs:parking/marker lamps
electrical:lamps/bulbs:puddle/mirror lamps
electrical:lamps/bulbs:turn signal lamps
electrical:start-charge
electrical:start-charge:alternator/generator
electrical:start-charge:battery
electrical:start-charge:ignition switch
electrical:start-charge:ignition switch:starting interlocks
electrical:start-charge:ignition switch:warning chimes
electrical:start-charge:starter
electrical:start-charge:starter:starter relay
electrical:start-charge:starter:starter solenoid electrical:start-charge:voltage regulator
electrical:unique electric vehicle components
electrical:unique electric vehicle components:ev charging
electrical:unique electric vehicle components:ev propulsion
electrical:unique electric vehicle components:ev storage/batteries
electrical:wiper/washer
electrical:wiper/washer:window washer
electrical:wiper/washer:window washer:rear glass washer
electrical:wiper/washer:window washer:washer pump and reservoir
electrical:wiper/washer:window washer:windshield washer
electrical:wiper/washer:window wipers
electrical:wiper/washer:window wipers:headlight wipers
electrical:wiper/washer:window wipers:rear glass wipers/motor
electrical:wiper/washer:window wipers:windshield wipers/motor
electrical:wiring
electrical:wiring:circuit protection
electrical:wiring:circuit protection:distribution box
electrical:wiring:circuit protection:fuse box
electrical:wiring:circuit protection:fuses/fusible links
electrical:wiring:connectors
electrical:wiring:entertainment/accessory wiring
electrical:wiring:exterior lighting wiring/switches
electrical:wiring:ground wires
electrical:wiring:instrument panel wiring
electrical:wiring:main body wiring
electrical:wiring:start-charge wiring
electrical:wiring:trailer tow wiring
powertrain
powertrain:aux/pto
powertrain:engine
powertrain engine:accel pedal/linkage/controls
powertrain:engine:accessory drive
powertrain:engine:accessory drive:belts
powertrain:engine:accessory drive:pulley/tension
powertrain:engine:air induction
powertrain:engine:air induction:air cleaner assembly
powertrain:engine:air induction:intake manifold
powertrain:engine:air induction:supercharger
powertrain:engine:air induction:throttle body
powertrain:engine:air induction:turbocharger
powertrain:engine:base engine
powertrain:engine:base engine:block
powertrain:engine:base engine:crankshaft/damper/bearings
powertrain:engine:base engine:flywheel
powertrain:engine:base engine:pistons and pins
powertrain:engine:base engine:rods
powertrain:engine:base engine:seals and gaskets (not oil pan or head gasket)
powertrain:engine:cooling system
powertrain:engine:cooling system:cooling fan and motor
powertrain:engine:cooling system:cooling hoses/tubes
powertrain:engine:cooling system:level/temp indicator
powertrain:engine:cooling system:radiator
powertrain:engine:cooling system:reservoir
powertrain:engine:cooling system:thermostat
powertrain:engine:cooling system:water pump
powertrain:engine:cylinder head
powertrain:engine:cylinder head:cylinder head gasket
powertrain:engine:cylinder head:head body
powertrain:engine:electronic engine control
powertrain:engine:electronic engine control:diagnostics
powertrain:engine:electronic engine control:engine control actuators
powertrain:engine:electronic engine control:module
powertrain:engine:electronic engine control:sensors
powertrain:engine:emissions
powertrain:engine:emissions:air pump
powertrain:engine:emnissions:egr system
powertrain:engine:eemissions:pcv system
powertrain:engine:exhaust
powertrain engine:exhaust:attachment
powertrain:engine:exhaust:catalytic convertor
powertrain:engine:exhaust:exhaust manifold
powertrain:engine:exhaust:exhaust pipe
powertrain:engine:exhaust:heat shields
powertrain:engine:exhaust:muffler/resonator
powertrain:engine:fuel system
powertrain:engine:fuel system:attachment
powertrain engine:fuel system:carburetor
powertrain:engine:fuel system:evaporative system
powertrain:engine:fuel system:filler neck/cap
powertrain:engine:fuel system:fuel filter
powertrain:engine:fuel system:fuel hoses/tubes
powertrain:engine:fuel system:fuel pump
powertrain:engine:fuel system:fuel rail
powertrain:engine:fuel system:fuel tank
powertrain:engine:fuel system:injector/seals
powertrain:engine:fuel system:roll-over valve
powertrain:engine:fuel system:tank selector
powertrain:engine:ignition system
powertrain:engine:ignition system:coil wire and plug wires
powertrain:engine:ignition system:distributor
powertrain:engine:ignition system:ignition coil
powertrain:engine:ignition system:ignition module
powertrain:engine:ignition system:spark/glow plugs
powertrain:engine:miscellaneous controls
powertrain:engine:miscellaneous tubes and hoses
powertrain:engine:miscellaneous vacuum components
powertrain:engine:mounts/dampers
powertrain:engine:oil system
powertrain:engine:oil system:level indicator/dipstick
powertrain:engine:oil system:oil cap
powertrain:engine:oil system:oil filter
powertrain:engine:oil system:oil pan and crank sealing
powertrain:engine:oil system:oil pump
powertrain:engine:timing system
powertrain:engine:timing system:camshaft
powertrain:engine:timing system:tensioner/guides
powertrain:engine:timing system:timing belt/chain
powertrain:engine:timing system:timing gear/sprocket/aux. drive shaft
powertrain:engine:valve train
powertrain:engine:valve train:rocker arms and support
powertrain:engine:valve train:seal—valve guide
powertrain:engine:valve train:tappets and push rods
powertrain:engine:valve train:valves
powertrain:transmission
powertrain:transmission:automatic
powertrain:transmission:automatic:bands and servos
powertrain:transmission:automatic:case and housing powertrain:transmission:automatic:clutch and sun gears
powertrain:transmission:automatic:control valve assembly
powertrain:transmission:automatic:cooler and tubes
powertrain:transmission:automatic:differential and bearings
powertrain:transmission:automatic:electronic trans controls
powertrain:transmission:automatic:indicator/dipstick/filler tube
powertrain:transmission:automatic:linkage/shift lever
powertrain:transmission:automatic:output shaft
powertrain:transmission:automatic:pan/gaskets/seals
powertrain:transmission:automatic:parking pawl
powertrain:transmission:automatic:planetary assembly
powertrain:transmission:automatic:speedo drive
powertrain:transmission:automatic:torque converter
powertrain:transmission:automatic:trans fluid pump
powertrain:transmission:automatic:vent area
powertrain:transmission:clutch
powertrain:transmission:clutch:clutch disc
powertrain:transmission:clutch:clutch pedal and linkage
powertrain:transmission:clutch:hub and bearing
powertrain:transmission:clutch:pressure plate
powertrain:transmission:manual
powertrain:transmission:manual:bearings
powertrain:transmission:manual:case and housing
powertrain:transmission:manual:differential and bearings
powertrain:transmission:manual:electronic trans controls
powertrain:transmission:manual:gaskets and seals
powertrain:transmission:manual:gears
powertrain:transmission:manual:linkage/shift lever
powertrain:transmission:manual:shafts
powertrain:transmission:manual:speedo drive
powertrain:transmission:manual:synchronizer assembly
Publications
publications:labels
publications:owner's manual
publications:scheduled maintenance guide
Target, indicates the overall type of the defect.
  Mechanical
  Electrical
  Software/Firmware/Logic
Scope of Fix
  Part
  Subsystem
  Product
  Manufacturing-related equipment
  Transportation-related equipment
Corrective Action indicates what was done to overcome the defect. IN the preferred automobile-related embodiment of the current invention, these actions comprise:
  Replace, Replace an existing part with a new part
  Adjust/Lubricate, Make adjustment or lubrications to existing parts
  Reflash, Reprogram a part
  Appearance Fix, Correct problem with product's external finish (e.g., paint)
  Install-New, Install a new part that was not in the design
  Remove, Remove a part previously installed
  Reassemble, Re-Install the same part
  Install-Missing, Install a new part that was missing and included in the design
Responsible Agent indicates the owner of the process that the caused problem. In the present automobile-related embodiment of the current invention this comprises:
  Tier 3, Parts Supplier
  Tier 2, Subsystem Supplier
  Tier 1, Product Developer
  OEM's Manufacturing Department
  OEM's Transportation Department
Part # indicate the manufactures ID for the given defective effective part
Charge Type indicates whether or not the charge for the repair of the given defect was covered by warranty or not. A skilled artisan will appreciate that in many cases it is possible for this attribute to be automatically computed by, e.g., by comparing the Ownership Duration to the Open Date.

In addition to openers and closers, there are mapped attributes whose values for a given defect are computed from other attributes for the given defects. M-Symptoms-Reveal Conditions
  Part History indicates when defect was introduced. This is derived from the Part# and product VIN, which indicates the product's date and location of construction. These values comprise:
    Earlier, Part used in prior make/model/years
    New, First time part used in a make/model/year
    Engineering Change, Part used in make/model, noted engineering change
    Bad Fix, Previous fix did not address defect.
  Test Type indicates the type of test that should have caught the given defect. An example list from an embodiment follows:
    Part Testing, Smallest definable unit
    Subsystem Testing, Combination of Parts
    Product Testing, Combination of Subsystems
    (Vehicle) Safety Testing, Crash, Roll-Over, Skid, Fire, Airbags, Seat Belts, Look at Safety Features on Vehicle, Bumper Dents
    (Vehicle) Road Testing, Road test is like a final integration or system test of the vehicle
    (Vehicle) Manufacturing Testing, Manufacturing tests of the vehicle, done on each build
The Test Type attribute can be determined from a given defect's conditions-revealing-defect and ownership-duration. An example of a set of mappings for the preferred embodiment is as follows:

TABLE 1

| Test Type | Revealing Conditions | Ownership Duration |
|---|---|---|
| Part Testing | Coverage | Long |
|  | Variation | Long |
|  | Stress | Long |
| Subsystem Testing | Interaction | Long |
|  | Sequence | Long |
| Product Testing | Startup/Restart | Long |
|  | Workload/Stress | Long |
| Safety Testing | Recovery/Exception | Long |
| Road Testing | Environmental | Long |
|  | Driving Conditions | Long |
|  | Sensory Inspection | Long |
| Manufacturing Testing | Hardware Configuration | Short |
|  | Software Configuration | Short |
|  | Sensory Inspection | Short |
|  | Coverage | Short |
|  | Variation | Short |

There are also derived attributes whose values for a given defect can only be computed when all of the defects and all other attributes have been computed

Units Affected, indicates the total number of product instances that have suffered from this same defect. It is derived by counting the number of defects that identical part # and corrective action value.

Phase of Defect Injection indicates the process in which the given defect was created. This attribute can be determined from a given defect's scope of fix, corrective action and # of units. An example of a set of mappings for the preferred embodiment are as follows:

TABLE 2

| Phases of Defect Injection | Scope of Fix | Corrective Action | # of Units |
|---|---|---|---|
| Design (Requires in-depth analysis to determine root of defect -part, subsystem or product) | Part | Remove | Any number |
| | Component | Remove | Any number |
| | Part | Install-New | Any number |
| | Component | Install-New | Any number |
| | Part(s) | Replace | >1000 |
| | Component | Replace | >1000 |
| | Part | Adjust/Lubricate | >1000 |
| | Component | Adjust/Lubricate | >1000 |
| | Sub System | Replace | Any number |
| | System(s) | Replace | Any number |
| | Part(s) | Reflash | Any number |
| | Component | Reflash | Any number |
| | Sub System | Reflash | Any number |
| | System(s) | Reflash | Any number |
| Manufacturing-Body | System | Adjust | Any number |
| Manufacturing-Paint | Part | Appearance Fix | >1000 |
| | Subsystem | Appearance Fix | >1000 |
| | Product | Appearance Fix | >1000 |
| Manufacturing-Assembly | Part(s) | Replace | 1-1000 |
| | Component | Replace | 1-1000 |
| | Part | Adjust/Lubricate | Any number |
| | Component | Adjust/Lubricate | 1-1000 |
| | Sub System | Adjust/Lubricate | Any number |
| | System | Adjust/Lubricate | Any number |
| | Part(s) | Install-Missing | Any number |
| | Component | Install-Missing | Any number |
| | Part(s) | Reassemble | Any number |
| | Component | Reassemble | Any number |
| Post Production Build & Package/Transportation | Part | Appearance Fix | 1-1000 |
| | Subsystem | Appearance Fix | 1-1000 |
| | Product | Appearance Fix | 1-1000 |
| Post Production Dealership Options | Part | Install-New | Any number |
| | Component | Install-New | Any number |

A skilled artisan will appreciate that the current invention also covers the phase at which a given product's requirements are determined as a Phase of Defect Injection.

Every defect is classified with each of the attributes above with all of the data stored in the PSEC Server Database 4120. Note that the PSEC Scheme includes data concerning not only software, but hardware and electronics as well (e.g., in the Parts Hierarchy). Further, note that the PSEC Scheme also includes data and analysis techniques targeting mass manufacturing production processes (e.g., Test Type:Manufacturing Test and Phase of Defect Injection: Manufacturing).

As is described in detail with reference to FIG. 6, the Analysis Handler 4100 uses the classified defect data stored in the PSEC Server Database 4120 to provide data for and answers to questions related to the production and testing process of the mass manufacturer.

As is described in detail with reference to FIG. 6, the Suggested Actions Reports handler 4110 compiles the charts and text results stored in the PSEC Server Database 4120 to generate a report containing suggested modification to one or more production or testing processes in the mass manufacturing industry's production, testing, and delivery processes. Such suggestions can include, but are not limited to the addition of a new test phase, or an indication of whether or not a given product is ready for public sale. In addition to textually described suggestions, the report can also include graphical charts justifying the given suggestions, often more than two or more such graphical charts per suggestion.

A skilled artisan will appreciate that the current invention also includes a PSEC scheme that includes the service context in which a given defect was found as an attribute, with values including but not limited to:scheduled maintenance, nonscheduled maintenance, and product recall.

A skilled artisan will further appreciate that the current invention also includes a PSEC scheme that includes the attributes that indicate the complexity level—e.g., indicated numerically—of other attributes. Examples include, but not limited to Condition Revealing Defect Complexity:

1 for Single Function
2 for Single Function with Option
3 for Interaction and Sequencing
4 for Workload/Stress, Recovery/Exception, Startup/Restart, Environmental, and Stress.

Figure 5:
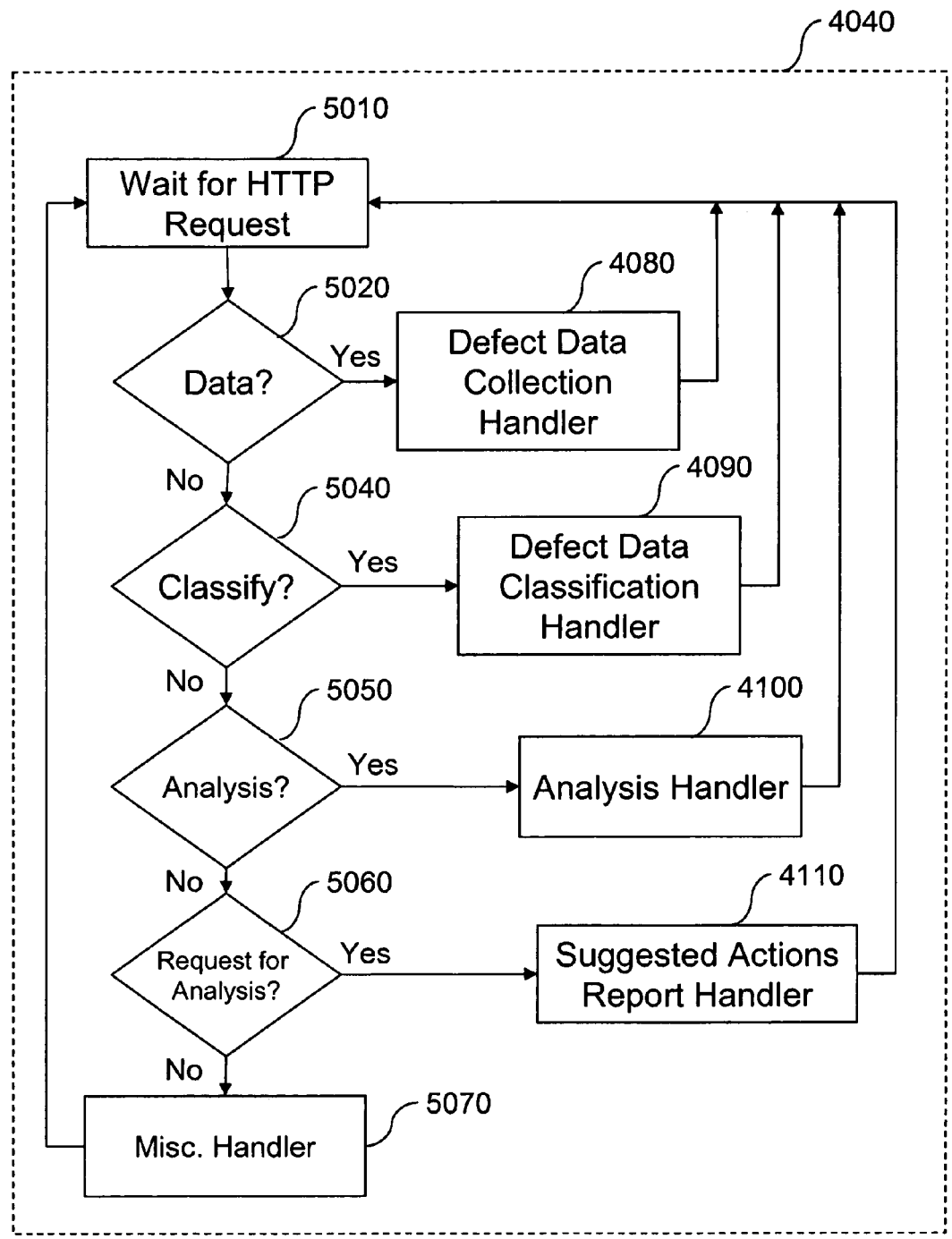
FIG. 5 is an illustrative flow diagram of the operation of a PSEC Server according to one embodiment of the invention.

FIG. 5 is a detailed flow diagram of the operation of the PSEC Server logic 4040. In step 5010, the HTTP Server Handler 4050 awaits an HTTP request. When such a request arrives, step 5020 checks whether it is a request for the Defect Data Collection Handler 4080. If so, this handler 4080 is invoked following which control continues at step 5010. If the request is not for the Defect Data Collection Handler 4080, then step 5040 checks whether it is a request for the Defect Data Classification Handler 4090. If so, this handler 4090 is invoked following which control continues at step 5010. If the request is not for the Defect Data Classification Handler 4090, then step 5050 checks whether it is a request for the Analysis Handler 4100. If so, this handler 4100 is invoked following which control continues at step 5010. If the request is not for the Analysis Handler 4100, then step 5040 checks whether it is a request for the Suggested Actions Report Handler 4110. If so, this handler 4110 is invoked following which control continues at step 5010. If the request is not for the Actions Report Handler 4110, then a miscellaneous handler, beyond the scope of the current invention, is called in step 5070, following which control continues at step 5010.

Figure 6:
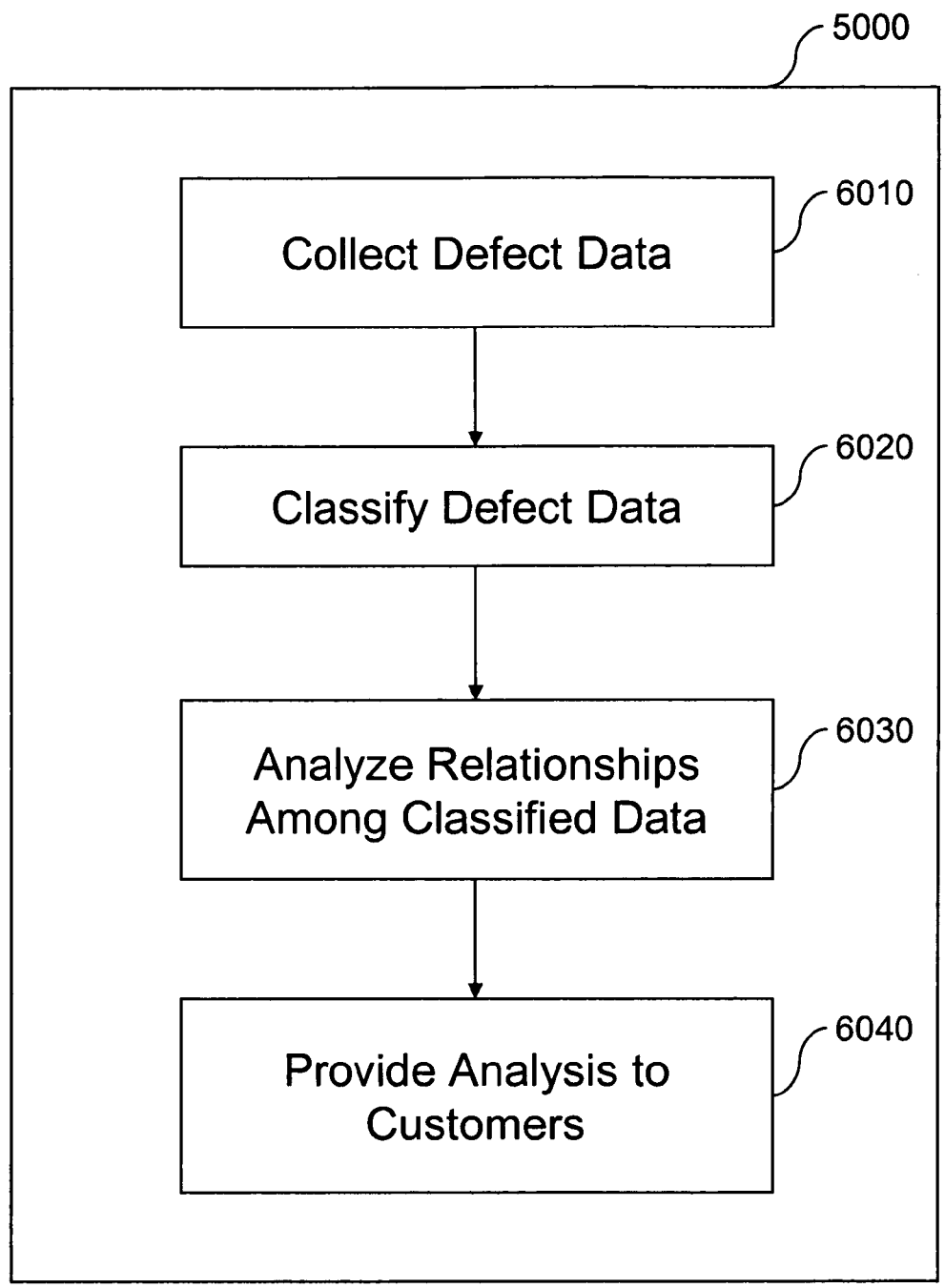
FIG. 6 is an illustrative flow diagram of the operation of the PSEC Method according to one embodiment of the invention.

Referring to FIG. 6, a flow diagram 5000 of the operation of the current embodiment is shown. In particular, a case involving an automobile manufacturer is given. First, in step 6010 all defect data for a particular make (e.g., Ford) and model (e.g., Corvette) of car is collected, this data being using the Defect Data Collection Handler 4080 from any of Clients A-D 3100-3130 via the PSEC Client Applet 4060. Skilled artisans will appreciate that any additions could be made manually (i.e. by a human typing information into a computer running the PSEC Client Applet 4060 via a web browser, or by an automatic data collection program, also which communicates with the PSEC server 3050 via the PSEC Client Applet 4060. Thus, the current embodiment allows a given mass manufacturing industry to automate its defect data collection. Skilled artisans will appreciate that this defect data includes in-process production data (e.g., data from the Mass Manufacturing Plant 3010), as well as post-sales, service data (e.g., from the Product Dealer 3020, or the Product Service Provider 3030).

Next, in step 6020, the defect data is classified using the Defect Data Classification Handler 4090, again via accesses from Clients A-D 3100-3130. Skilled artisans will appreciate that although the classifications may be made by employees of the manufacturing organization (e.g., Ford), including but not limited to domain experts, a service organization could also provide one or more of the classifications.

A skilled artisan will appreciate that if a given mass manufacturing organization obtained its parts 120 or subsystems 1010 from another given component supplier, and if that given component supplier used to current invention to analyze its defects, then the mass manufacturing organization could use the PSEC scheme-based classified defect data for its own defect analysis.

Next, in step 6030, using the Analysis Handler 4100, relationships amongst the classified data are sought to answer questions relevant to the mass manufacturer (e.g., which production process(es) is(are) producing the defects that drive the majority of the warranty costs?). This research can also provide indications of salient problems. For example, suppose that a chart displaying the number of defects that escape from (i.e., are not caught by) each of the test processes 2020, 2040, 2070, 2100, 2130 and 2160 shows that vast majority come from the Part testing phase 2040. Then, if the goal of the given mass manufacturer is to save money, more attention and/or resources (e.g., time, and personnel) should be spent on Part testing 2040, so as to keep these defects from escaping to the later stages where they are more expensive to overcome.

The Analysis Handler 4100 also includes rules that test the classified data to answer specific questions. Skilled artisans will appreciate that one or more of these rules can be provided when the current invention is first provided to a given organization (e.g., mass manufacturer). An example of such a rule would be one that reviews the Product Impact of the defects and then specifies the given product's reliability:e.g., "high" returned if none of the defects made the product inoperable, "average" if only a few did, and "low" if most defects did.

Finally, in step 6040, the current invention compiles a charts and results into a report using the Suggested Actions Report Handler 4110. Skilled artisans will appreciate that Suggested Actions Report Handler 4110 could either of following methods:

Automatic compilation of all charts and results generated by the Analysis Handler 4100 and stored in the PSEC Server Database 4120, or Allowing an end-user to select the charts and results they wish to include and then compiling only entities into the final report.

A skilled artisan will appreciate that one or more members of a service organization could provide the chart and result selection described above instead of an employee of the mass manufacturer, A skilled artisan will also appreciate that the current invention could be executed multiple times by a given organization, e.g., periodically, say once a year, or to every new version of a given product. By doing this and comparing the results of each execution (e.g., comparing the reports produced in step 6040) the benefits realized by the given organization could include:

Verifying that they are overcoming problem indicated in earlier reports, e.g., by checking the previous problems either vanish or are less severe in later reports.;

Verifying that their product are becoming more stable, reliable, or safe, e.g., by comparing the respective levels of stability, reliability, and safety between reports; or Verifying that are maintaining a sufficient level of production and testing quality, e.g., by verifying that no new or higher severity problems are reported in later reports.

A skilled artisan will further appreciate that PSEC analysis reports from different organizations could be compared so as to judge the strengths and weaknesses of the organizations.

A skilled artisan will also appreciate that by using the both Charge Type attribute (i.e., whether or not the defect's repair was covered by warranty) and the Repair Cost attributes, the analysis provided by the Analysis Handler 4100 and reported by the Suggested Actions Report Handler could include consideration of each defect's warranty cost. Thus, a given organization interested in reducing their warranty-related costs could use the current invention to indicate relevant problems and to suggest corrective modifications to their production and testing processes.

A skilled artisan will also appreciate that by comparing and analyzing the classified defects data, especially using the In-Process attribute, the current embodiment can be used to compare defects that escaped (i.e., were created and yet not caught) the product's development and production to those that occurred our in the field.

A skilled artisan will finally appreciate that the current embodiment could be provided as a service by a service organization to the mass manufacturer. This service could include the service organization collecting the defects, classifying the defects, analyzing the classified defects and generating the report summarizing the analysis. This service could be offered on a continuing basis, e.g., the service organization could analyze and provide an analysis report to the mass manufacturer each year. The service could also include modifications and updates to the PSEC scheme used to analyze the given mass manufacturer.

A skilled artisan will further appreciate that variations, modifications, and other implementations of what is described herein may occur to those of ordinary skill in the art without departing from the spirit and scope of the invention. Accordingly, the invention is defined by the following claims and not to be defined only by the preceding illustrative description.

We therefore claim:

1. A computer-implemented method of optimizing at least one of a design, production or testing process in a mass manufacturing process, the method comprising steps of:

collecting error data relating to a product at a plurality of points along its design, production and distribution chain, wherein the error data comprises both test data found during production testing of the product, as well as post production customer service events;

classifying the error data into categories of errors to provide classified error data;

analyzing relationships among the classified error data; and recommending modifications to an end user for at least one of the design, production, delivery, or testing processes based on the analysis, the recommending step comprising steps of:

recommending modifications to the design of the product if the error data is collected after design but before manufacture of the product, and if a design error is found;

recommending modifications to the delivery process if the error data is collected after delivery, and if an error is found;

recommending modifications to the production process if the error data is collected after producing part of the product and if a part error is found;

recommending modifications to the process of making a subsystem of the part if the error data is collected after producing the subsystem of the product comprising the part; and recommending modifications to the mass manufactuing process if the error data is collected after mass manufacturing, but before delivery, and if a mass manufacturing error is found.

2. The method of claim 1, wherein the categories of errors include at least one of the following:

errors found during product development;

errors found in instances of the product after manufacturing, but before delivery;

errors that occur as a result of the transportation process; and errors found by a product service provider.

3. The method of claim 1 wherein the modifications include a correction of problems in one or more of the following: design, test, manufacturing, and transportation in the mass manufacturing process.

4. The method of claim 1 wherein the method is performed in a plurality of iterations to ensure continuous improvement.

5. The method of claim 1, wherein the error data is at least one selected from the following attribute types: phase when found, vehicle identification, unique identifier, revealing condition, open date, close date, customer impact, ownership duration, product impact, non-product impact, scope of fix, corrective action, responsible agent, part history, part hierarchy, part number, number of hits affect, and complexity level.

6. The method of claim 1, further comprising steps of:

mapping a symptom to a revealing condition;

mapping the revealing condition to a test type, and mapping a scope of a fix to phases of error injection mapping.

7. The method of claim 1, wherein error data and analysis from a parts supplier can be used for a more comprehensive analysis of an organization that uses the supplied parts.

8. The method of claim 1, wherein classifications are derived automatically.

9. The method of claim 8, wherein the classifications are based on one or more of a scope of fix, action, and a duration of ownership, and phase of error injection.

10. The method of claim 1, further comprising performing an analysis of aspects of the mass manufacturing development process and product, including at least one of: evaluating testing effectiveness; evaluating mass manufacturing process; evaluating; transportation process; identifying safety concerns; comparing in-process with post sales problems.

11. The method of claim 10, wherein the analysis of a given aspect of the mass manufacturing process includes the generation of two or more graphical representations of the classified error data.

12. The method of claim 11, wherein each graphical presentation includes one or more interpretations, including text.

13. The method of claim 1 further comprising a step of enabling the end user to provide the method steps of collecting, classifying, analyzing and recommending for a second user.

14. The method of claim 13 further enabling the end user to provide the steps of collecting, classifying, analyzing and recommending on a continuing basis to the second user.

15. The method of claim 13 further enabling the end user to update the steps or analysis techniques or both.

16. The method of claim 1 wherein the product of the mass manufacturing development process includes integrated software, hardware, and electronics.

17. The method of claim 1 wherein error data and analysis are used as a reliability measure for the overall quality of the process and product.

* * * * *